United States Patent [19]
Lohn et al.

[11] Patent Number: 5,883,916
[45] Date of Patent: Mar. 16, 1999

[54] INTEGRATED VALVE AND FLOW CONTROL APPARATUS AND METHOD FOR CHEMICAL LASER SYSTEM

[75] Inventors: Peter D. Lohn, Torrance; Robert A. Schlichting, Cerritos, both of Calif.

[73] Assignee: TRW Inc., Redondo Beach, Calif.

[21] Appl. No.: 890,313

[22] Filed: Jul. 9, 1997

[51] Int. Cl.⁶ ............................. H01S 3/095; C01B 5/00; B01J 10/00
[52] U.S. Cl. ............................. 372/89; 372/55; 372/58; 372/59; 372/90; 423/579; 422/122; 422/129
[58] Field of Search .................. 372/55, 58, 59, 372/63, 65, 89, 90; 423/579; 422/122, 129

[56] References Cited

U.S. PATENT DOCUMENTS

| | | | |
|---|---|---|---|
| 4,310,502 | 1/1982 | Wagner | 423/579 |
| 4,318,895 | 3/1982 | Richardson et al. | 423/579 |
| 4,342,116 | 7/1982 | MacKnight et al. | 372/89 |
| 4,461,756 | 7/1984 | Rockenfeller | 423/579 |
| 4,558,451 | 12/1985 | McDermott et al. | 372/89 |
| 4,643,889 | 2/1987 | Uchiyama et al. | 423/579 |
| 4,653,062 | 3/1987 | Davis et al. | 372/89 |
| 4,668,498 | 5/1987 | Davis | 423/579 |
| 4,787,091 | 11/1988 | Wagner | 372/89 |
| 4,975,265 | 12/1990 | Hed | 423/579 |
| 5,246,673 | 9/1993 | Hed | 422/224 |
| 5,516,502 | 5/1996 | Dickerson | 423/579 |

OTHER PUBLICATIONS

Design and Test of an Inlet–Nozzle Device Fourth International Symposium on Jet Cutting Technology Apr. 12–14, 1978, Author—P.D. Lohn, et al.

*Primary Examiner*—Brian Healy
*Attorney, Agent, or Firm*—Michael S. Yatsko

[57] ABSTRACT

There is provided a cylindrical valve 20 for placement in the flow path of a singlet-delta oxygen generator 12 that feeds $O_2^*$ to a chemical laser gain medium 14. The feed path 22 includes a sharp 90° bend 24 that causes fluid velocity variations in $O_2^*$ entering the gain medium 14. Integral with the valve 20 is a tubular structure 12 having a partial circumferential radially extending surface 44 fitted with "O" ring for sealing and opening the feed path between the "$O_2^*$" generator 12 and gain generator 14. A series of vanes 32, 34, 36 disposed in velocity control zones 50, 52, 54 and 56 are integral with the valve 20 for leveling out the velocity variations and controlling the wake formation 58, 59 and 60 in the $O_2^*$ entering the gain generator 14.

30 Claims, 6 Drawing Sheets

INTEGRATED VALVE AND FLOW CONTROL APPARATUS AND METHOD FOR CHEMICAL LASER SYSTEM

FIELD OF THE INVENTION

The invention relates to apparatus for controlling the flow of singlet-delta oxygen from an oxygen generator over a non-rectilinear flow path to the laser gain generator and more particularly to a cylindrical valve construction including a series of vane members for producing a uniform rate of fluid flow across the non-rectilinear fluid path.

BACKGROUND OF THE INVENTION

Chemical laser systems are known to have the capability of generating high energy laser beams. One such system is the chemical oxygen iodine laser known as "COIL" which is particularly suitable for weapons systems because of its range and the ability to control the high intensity beam to a target responsive to mobile target surveillance techniques.

The operation of the COIL involves a basic hydrogen peroxide ("BHP") dispersed into a reactor as highly dispersed liquid droplets. Chlorine gas is then mixed with an inert carrier gas and reacted with the BHP to generate and the singlet-delta oxygen. The reaction product flows out of the singlet oxygen generator ("SOG") and passed into the laser gain generator. Singlet-delta oxygen is denoted by symbol $O_2^*$. In the gain generator the $O_2^*$ reacts with iodine. The energy is extracted as coherent laser radiation in an optical cavity transverse to the flow of the reactants in the cavity. The chemistry of the COIL system is described in co-pending application Ser. No. 08/762,180, pending, filed in the name of Charles Clendenning, et al. and is assigned to the same assignee as the instant application. The architecture of a suitable apparatus to implement the chemical process for generating the high energy beam requires several different modular systems such as the SOG, thermal management system of the basic hydrogen peroxide solution, a fluid supply system, a pressure recovery system, and the gain generator system. The general architecture is described in the co-pending patent application filed of even date herewith under Ser. No. 08/762,180, pending, and is assigned to the same assignee as this application.

The invention in this application is directed to the control of fluid namely the $O_2^*$ from the SOG to the laser gain generator in a non-rectilinear path which, unless modified, introduces variations in uniformity of the flow rate as the $O_2^*$ courses over sharp bends in the feed line. Considering the size and complexity of the apparatus once the various modules are assembled together it becomes necessary to fold the system in order to install it in a suitable mobile carrier such as an airplane or large truck. In order to avoid stretching out the apparatus in a straight line (to avoid disturbances in the fluid flow) the SOG and the gain generator system arranged in a parallel juxtaposition to one another so that the out feed of the $O_2^*$ and the in feed reside in different nonaligned planes that necessitate a sharp turn in order to feed the $O_2^*$ from the SOG to the gain generator module.

A 90° turn in the feed line results in varying the rate of flow of the reactive $O_2^*$ across the cross-sectional area of the feed line. At the turn the $O_2^*$ experiences an increase in pressure at the large radius turn portion of the feed line and a decrease at the small radius turn. This also results in flow separation along the wall. The thermodynamic reaction energy with the iodine is such that as the active iodine encounters different flow rates of oxygen at the center of the feed line compared to the inside boundaries of the feed line walls it results in density fluctuations in the reaction chamber. This can adversely affect the quality of the laser beam by diffusing or spreading the beam pattern.

Another problem that is encountered in the architecture of these systems is the valve control for opening the feed line to supply the $O_2^*$ to the gain generator and to effectively shut down the system. The use of conventional valves such a gate valve, results in incrementally opening the cross section of the feed line that could also affect the quality of the beam in that the $O_2^*$ is fed in at different rates during the time it takes to completely open the feed line.

Previously known architectures for generating high energy chemical laser beams usable to engage incoming hostile missiles have presented problems in terms of requiring serially stringing out the processing modules which hampers the transportability of the system for the reason that they require unusually large vehicles, either airborne or land based.

It is an object of the present invention to overcome one or more of the problems.

SUMMARY OF THE INVENTION

In accordance with the teachings of the present, there is provided apparatus and a method for controlling the feed of $O_2^*$ from a singlet delta oxygen generator to a laser gain generator over a non-rectilinear path from a first direction to a second direction, a laser gain generator and a feed line having an exit mouth portion communicating with said singlet delta oxygen generator and with the laser gain generator. A cylindrical valve comprises a valve body and a tubular structure rotatably mounted in the valve body and adopted to rotate about its longitudinal access having axially extending stub shafts. The tubular structure has an outer surface that partially extends circumferentially about the structure extending the full longitudinal extent of the tubular structure. The partial circumferential radially extending surface is formed with a "U" shaped trench that surrounds its peripheral edge. An "O" ring is pressed fit into the trench and fittingly engages the perimeter of the exit mouth of SOG. In the open position fluid can flow through the cylinder and in the closed position the partial circumferential outer surface with the resilient "O" ring engages the periphery of the exit mouth portion closing off the flow of $O_2^*$.

Integral with the cylindrical valve there is provided a series of curvilinear vanes positioned parallel to the longitudinal axis and forming an array of separators disposed transverse to the direction of the $O_2^*$ flow. The tubular structure is formed into four separate axially extending compartments within the tubular structure by a series of radial wall portions positioned normal to the longitudinal axis. The vanes are arranged in each of the compartments to form different flow velocity zones through the valve to eliminate or minimize for the boundary layer separation that the gas experiences just beyond the inside of the sharp 90° turn in the feed line.

The curvilinear vanes are concentrically arranged within the valve in each of separate compartments at varying distances from the center of inside turn of the feed line to create a series of flow control zones that levels out the $O_2^*$ velocity entering the gain generator. The radial distances of each vane in each zone from the center of the inside turn is staggered to minimize the wake effect of the $O_2^*$ passing through the vanes on the Fresnel core of the gain generator.

The cylindrical valve is mounted providing a primary closure that operates eccentrically on the longitudinal axis bringing the "O" ring cylinder into the closed position or into the open position without damaging the "O" ring cylinder.

An auxilliary eccentric control is optionally provided for achieving a secondary closure of the valve by an eccentrically mounted lever that gradually urges the cylindrical valve into a first contact position with the periphery of the mouth portion after the initial closure by the primary control in order to effect a better seal. When opening the valve the auxilliary control moves the "O" ring cylinder to a second position easing the pressure between the periphery of the exit mouth and the "O" ring cylinder before the primary control fully opens the valve.

DESCRIPTION OF THE PREFERRED EMBODIMENT

Figure 1:
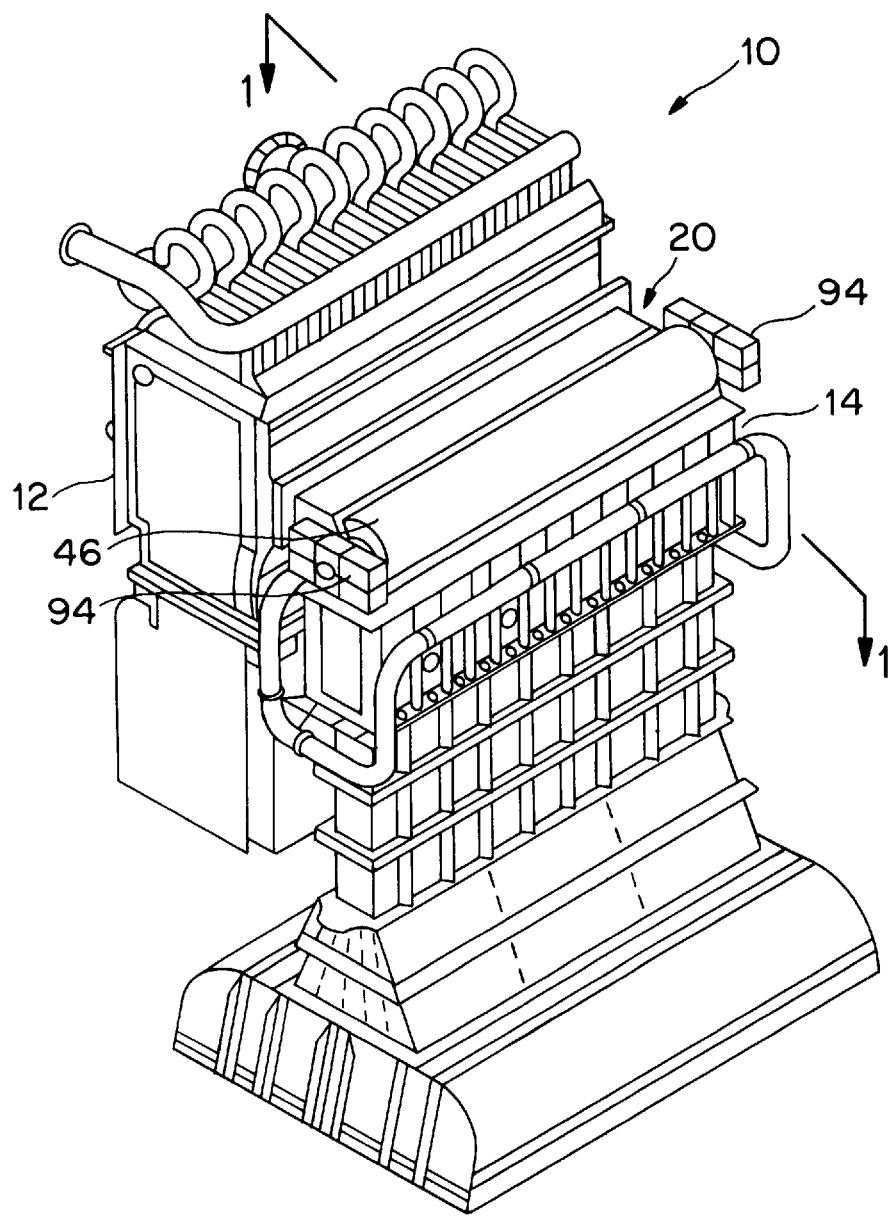
FIG. 1 is a perspective of the general assembly of the modules comprising the laser generating apparatus including the cylindrical control valve.

It should be noted from the outset that while this invention will be described in connection with a particular architecture, no limitation is intended thereby since the modifications will become apparent to those skilled in the art. With that caveat in mind the general arrangement of modules comprise the chemical laser apparatus identified generally with the reference numeral 10 shown in FIG. 1. The chemical laser apparatus 10 is made up of several modules that serve to implement the chemical process necessary to generate a coherent beam. The formation of the $O_2^*$ takes place in the singlet oxygen generator ("SOG") 12. The chemical reactions that is carried out in the generator 12 are generally known and will not be dealt with to any great extent in this description other then to state that $H_2O_2$ is reacted with chlorine to produce the $O_2^*$. The produced $O_2^*$ is then fed into a gain generator 14 where it reacts with iodine to generate the laser beam. The modules 12 and 14 are in communication through a valve structure identified generally with the reference numeral 20. As shown in FIG. 1 the $O_2^*$ is convected out of the SOG 12 which is positioned above the lever of the gain generator 14 requiring the gaseous material to make a 90° turn through the valve 20 and flowed downward into the gain generator 14. It will be appreciated that this change of direction of the $O_2^*$ imposes a critical condition on the reaction that takes place in the gain generator 14. The reference to a 90° turn is exemplary and it will be understood that any appreciable change in direction will likely cause disturbances. If one considers a system in which a plurality of the assemblies shown in FIG. 1 are to be placed in series in order to obtain a beam of sufficient power to kill a hostile ballistic missile it will require a rather large vehicle to render the system mobile.

Essentially the fluid flowing through the 90° turn typically causes variations in the delivery rate of the $O_2^*$ to the gain generator 14 such that without modifying the delivery architecture the quality of the beam is adversely effected.

Figure 2:
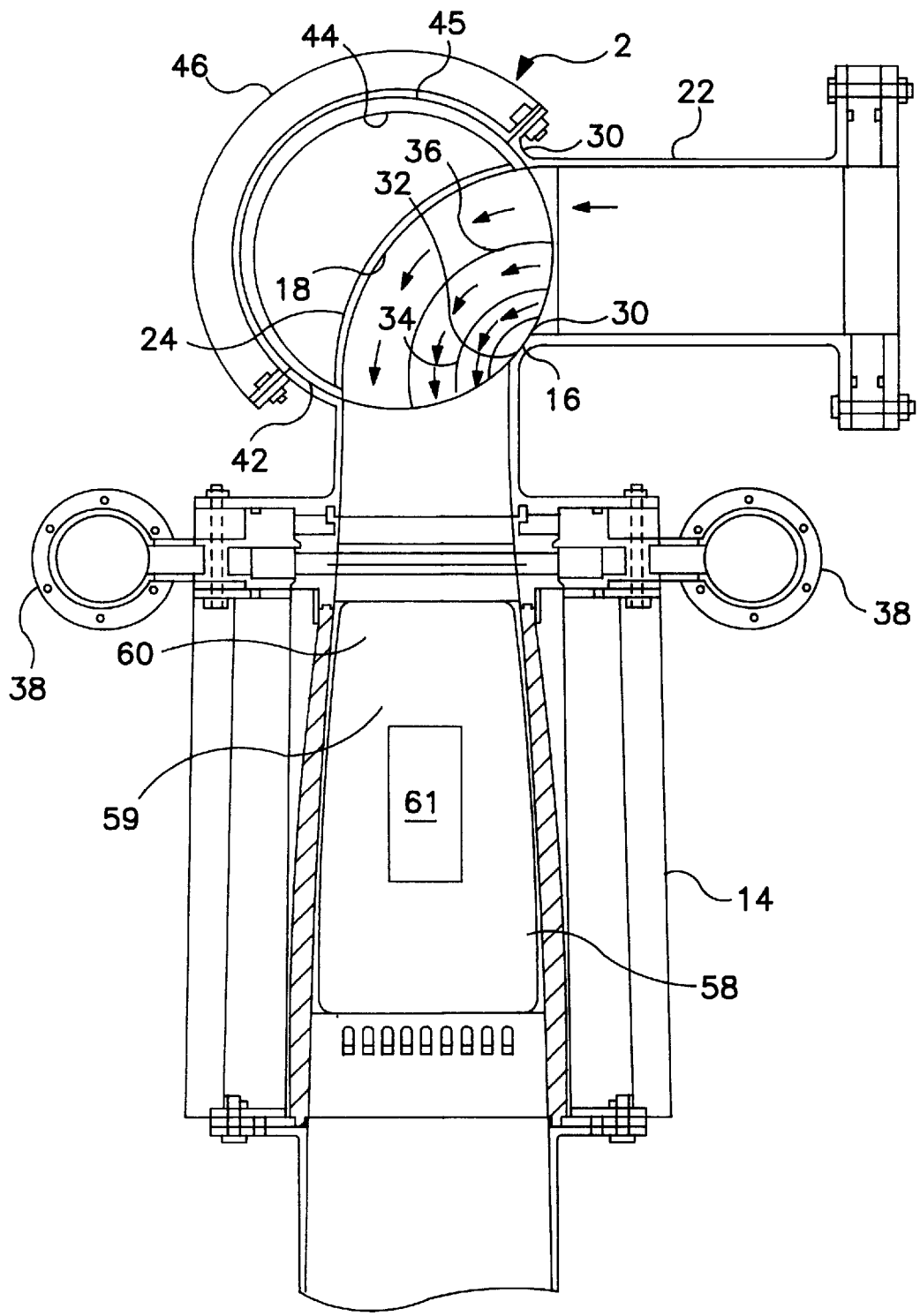
FIG. 2 is a cross section of the apparatus of FIG. 1 taking along line 1—1 of FIG. 1.

Referring to FIG. 2 there is shown a partial cross section of the general assembly 10 illustrating the position of the cylindrical valve 20 directing the $O_2^*$ from the SOG 12 to the gain module 14. The feed line 22 directs the $O_2^*$ through the 90° turn downward into the gain module 14. The valve 20 is interposed directly in the path of the $O_2^*$ being incorporated at the bend portion 24. The bend 24 is formed by the inside radius 16 and the outside radius 18. The feed line as it begins to make the bend portion 24 coincident with the valve 20 there is formed an exit mouth 30. It will be appreciated that the valve 20 is integrated with the feed line 22 so that the $O_2^*$ passes through the valve including the fluid control vanes 32, 34 and 36 that provide the essential fluid velocity control as hereinafter described.

Figure 3:
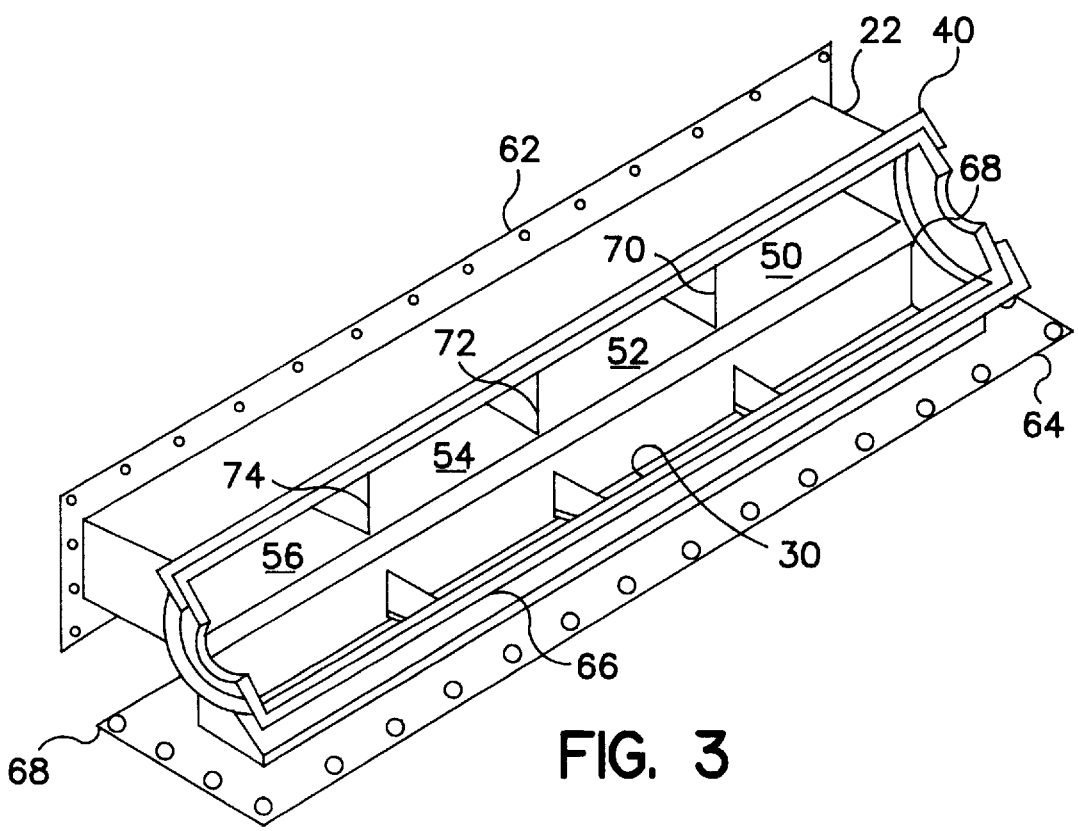
FIG. 3 is a perspective of the cylindrical valve body removed from the assembly of FIG. 1.
Figure 4:
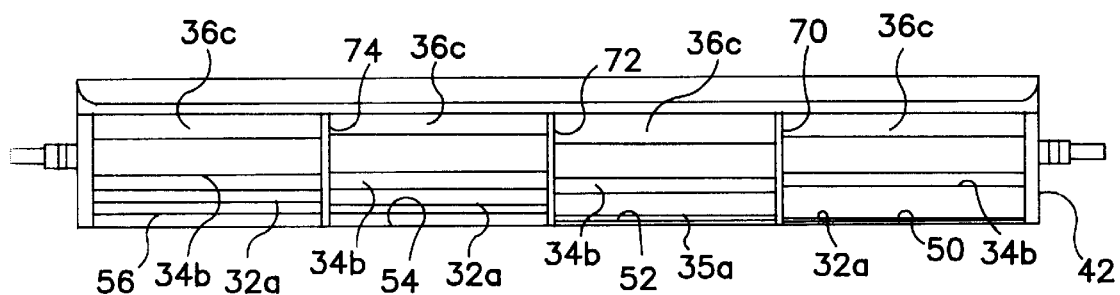
FIG. 4 is a front elevation of the tubular construction of the cylindrical valve showing the partially formed circumferential surface with the resilient "O" ring and vane assembly.

As shown in FIG. 3 the valve 20 comprises a valve body 40 adapted to receive the tubular structure 42 shown in FIG. 4. Continuing with reference to FIG. 2 the tubular structure 42 has a partial circumferential radially extending surface 44 that extends between its lateral ends. The surface 44 has an area and geometry that coincide with the area and shape of the exit mouth portion 30. Affixed to the peripheral edge of the surface 44 is an "O" ring 45 adapted to engage the peripheral edge 66 of the exit mouth 30 thereby closing the flow of oxygen to the gain generator 14. The details of affixing the "O" ring to the partial circumferential surface will be discussed hereinafter. There is provided a removable protective cover 46 which is bolted to the valve body 40 by a series of bolts 41 in order to provide access for the purpose of maintaining the valve. The feed line 22 and the valve body 40 are equipped with flanges 62 and 64 for bolting the fixture to the SOG 12 and the gain generator 14 respectively.

In addition to the valve structure 20 shown in FIG. 2 of the gain generator is equipped with a manifold feed system 38 to deliver iodine to the generator which is more fully described in co-pending application Ser. No. 08/762,180, pending, filed of even date herewith and assigned to the same assignee as this invention.

Referring again to FIG. 3 there is shown the valve body 40 affixed to the feed line 22 removed from the assembly 10. This clearly shows the formation of the exit mouth 30 having a plurality of compartments which serve as velocity control feed zones 50, 52, 54 and 56 for the $O_2^*$. Forming the zones 50, 52, 54 and 56 are separating walls 70, 72 and 74 which also serve to support the curvilinear vanes 32, 34, and 36 in position parallel to the longitudinal axis 68.

Figure 5:
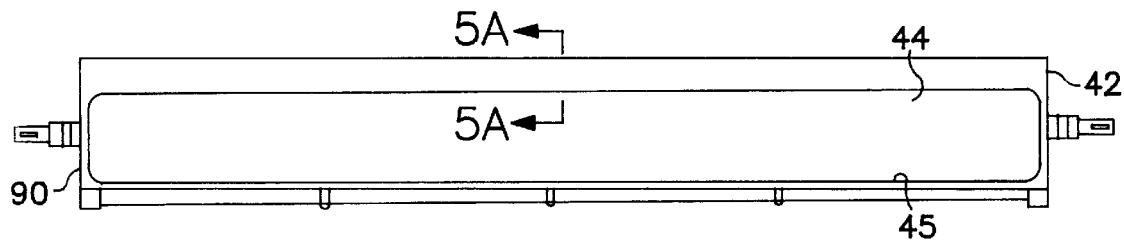
FIG. 5 is a top view of the tubular construction of the cylindrical valve showing the partially formed circumferential radially extended surface with the resilient "O" ring affixed.

Referring to FIGS. 4 and 5 there is further shown the tubular structure 42 with the zone 50, 52, 54 and 56 and the supporting walls 70, 72 and 74 as well as the series of vanes in each compartment 32a, 34b, and 36c in place in each of the zones. The position of the vanes in each of the zones is such that they level out the non-uniform velocity of the $O_2^*$ entering each zone in order to minimize the variations across the lateral extent of the exit mouth 30 caused by the sharp bend 16 in the feed line 22. In the zone 50 the curvilinear vanes 32a are placed a short radial distance from the radial center of the inside turn 16. The vane 34b is placed a predetermined radial distance from the center of the turn radius 16 as is the vane 34b in zones 52, 54 and 56.

The following table lists the placement of the curvilinear vanes in each of the zones to achieve the uniform velocity of $O_2^*$ being fed into the gain generator. The specific numerical values are exemplary of how the vanes are positioned in a particular architecture and staggered to first overcome the velocity variation due to the boundary separation and secondly to minimize the effect of the wake formation that is imparted to the $O_2^*$ as it enters the gain generator. Each radial distance was first determined to deal with the velocity problem and the increments which are added or subtracted to the radial distances provides the staggered arrangement that provides a clearance through gain generator 14 to deal with the wake formation 58, 59 and 60 in FIG. 2. The staggered arrangement creates a clearance in the gain generator directing the wake formation from the middle and outer vanes that avoids the Fresnel core 61.

TABLE

| ZONE | VANE DISTANCES IN INCHES FROM RADIAL CENTER 16 | | |
|---|---|---|---|
| | 32 | 34 | 36 |
| 50 | a 1.248 + 0.15 | b 1.947 + .15 | c 3,343 + .45 |
| 52 | a 1.248 | b 1.947 | c 3.343 + .3 |
| 54 | a 1.248 − .15 | b 1.947 − .15 | c 3.493 + .15 |
| 56 | a 1.245 + .3 | b 1.947 − .3 | c 3.343 |

Referring to the table, vanes 32a in each zone 50–56 are adjacent to the sharp radius 16. The vanes a, b and c are positioned in each zone in a manner that greatly reduces the boundary separation that could occur if no vanes were employed. The position of vanes a, b and c in each zone is staggered relative to the vanes in adjacent zones. In zone 54 the predetermined distances a, b and c are decreased by an increment of 0.15 inches and 36c is increased 0.15 inches again achieving an appropriate staggering relative to the "a" and "b" arrays. In zone 56 the 32a is increased 0.3 inches, 34b is decreased 0.3 inches and 36c retains its basic value.

To deal with the problem of wake formation the curvilinear vanes are disposed into several compartments as shown in Table I which provide zones 50, 52, 54 and 56 through which the $O_2^*$ must pass and in which the vanes are staggered so as to smooth out the wake formation. It has been found that in the chamber 14 there is a region of very high intensity known as the Fresnel core 61 through which pass the reflected radiation from the lasing iodine causing density variations in the medium and hence variations in the index of refraction. The construction shown in FIG. 4 and Table I shows that in the zone 50 the curvilinear vanes 32, 34 and 36 are arranged at different radial distances from the center of the sharp radius 16. The effect of this staggered array provides a wake clearance between zones 52 and 54 to greatly reduce the overall affect of the wake streams by having them overlap rather then to be reenforced.

The use of vanes to split the fluid moving through a sharp turn is discussed and described in a publication presented at the Fourth International Symposium on Jet Cutting Technology—in April, 1978; entitled: Design and Test of an Inlet-Nozzle Device, by Peter D. Lohn, et al.

The fluid at the sharp radius 16 of the bend (FIG. 2) moves at a lower velocity as indicated by the fewer number of arrows 76 because of the lower fluid pressure. This causes a boundary layer separation in the fluid stream adjacent the radius 16. The fluid in the center section of the feed line 22 travels at a greater slower rate and again this is indicated by the arrows 77 because of the increased fluid pressure. The fluid adjacent the larger turn radius 18 of the feed line causes the fluid to move at a greater velocity indicated by the arrows 78 because of the greater amount of fluid pressure.

The velocity variation over the cross section of the feed line 22 translates in delivering varying the amounts of $O_2^*$ entering the gain generator 14. The adverse effect is manifest by the iodine laser medium experiencing variations in the index of vanes in each of the zones is such that it levels out the velocity of $O_2^*$ flowing through each zone to minimize the variations. Variations in density results in poor performance causing beam to diffuse. Density fluctuations in the reaction chamber also lead to variations in the index of refraction that can't be corrected by the optics.

As shown in FIG. 4 the curvilinear vanes 32, 34 and 36 are disposed transverse to the flow of the $O_2^*$ so that as it makes the turn it will tend to restore the desirable laminar flow.

Previous flow splitting techniques failed to account for the adverse effects of wake formations in the fluid stream, particularly in the environment of feeding reactive fluids into a reaction chamber, causing disturbances that adversely affect the reaction.

Figure 5A:
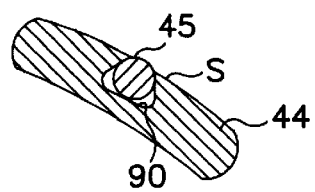
FIG. 5A is a cross section through the trench taken along 5A—5A of the FIG. 5 formed about the outer edge of the partial circumferential radially extended surface.

Referring to FIGS. 5 and 5A there is shown the tubular construction of the top view of the cylindrical valve of FIG. 4 illustrating the "O" ring 45 which surrounds the surface 44 of the tubular structure 42. The partial circumferential radially extending surface 44 is formed with a trench or cut out 90, shown in FIG. 5A, which captures the "O" ring 45. As shown in FIG. 5A the cross section of the trench 90 has a "U" shaped cross section which is wider at the bottom of the trench and narrower at the top so that where the edge of the slightly larger "O" ring 45 is pressed into the trench 90 a portion of the "0" ring 45 protrudes above the surface of the partial circumferential surface 44 by an amount shown as "S". As shown in FIG. 3 the exit mouth 30 has a finished perimeter edge 66 so that the "O" ring 45 forms an effective seal when the valve is closed.

The cylinder is mounted in the valve body 40 (FIG. 3) with the stub shafts 92 extending from the ends thereof to which is affixed the pneumatic drive elements 94 shown in FIG. 1.

Figure 6:
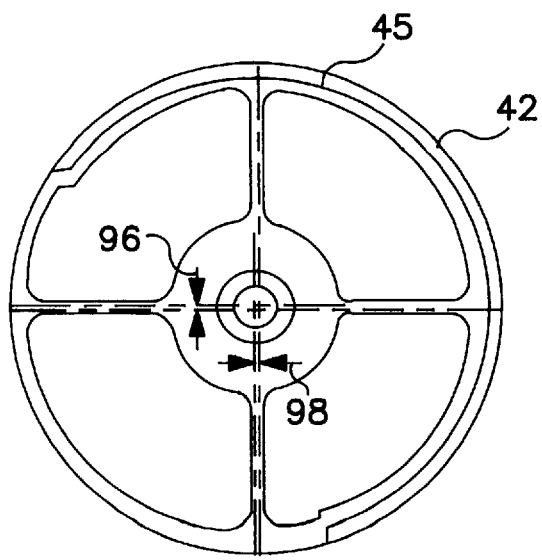
FIG. 6 is an enlarged detail of one end of the cylindrical valve of FIG. 5 showing the stub shafts and the mounting of the "O" ring on the partially formed circumferential surface.

It will be recognized that it is important for the "O" ring 45 shown in FIG. 5 to effectively seal the exit mouth 30 shown in FIG. 3 and in FIG. 2 in order to initiate the flow of oxygen as well as to stop the flow into the gain generator 14. To accomplish this it has been found desirable that the primary movement of the tubular construction 42 be advanced into its open and closed position through an eccentric movement. As shown in FIG. 6 the stub shafts are offset from the longitudinal axis 68 both in the vertical and horizontal direction as shown by the arrows 96 and 98. As an example the amount offset in the vertical direction is 0.023 inches and in the horizontal direction 0.020 inches. Understandably this amount of offset is merely exemplary and is not intended to be limiting. In operation the affect of such eccentric movement produces a very effective seal when closing the valve by providing a rotary motion to the closure of the exit valve 30 which has a rather irregular configuration. Similarly, when opening the valve the surface 44 "O" ring is rotated away from the exit mouth 30 without the risk of scraping or otherwise damaging its surface.

Figure 7:
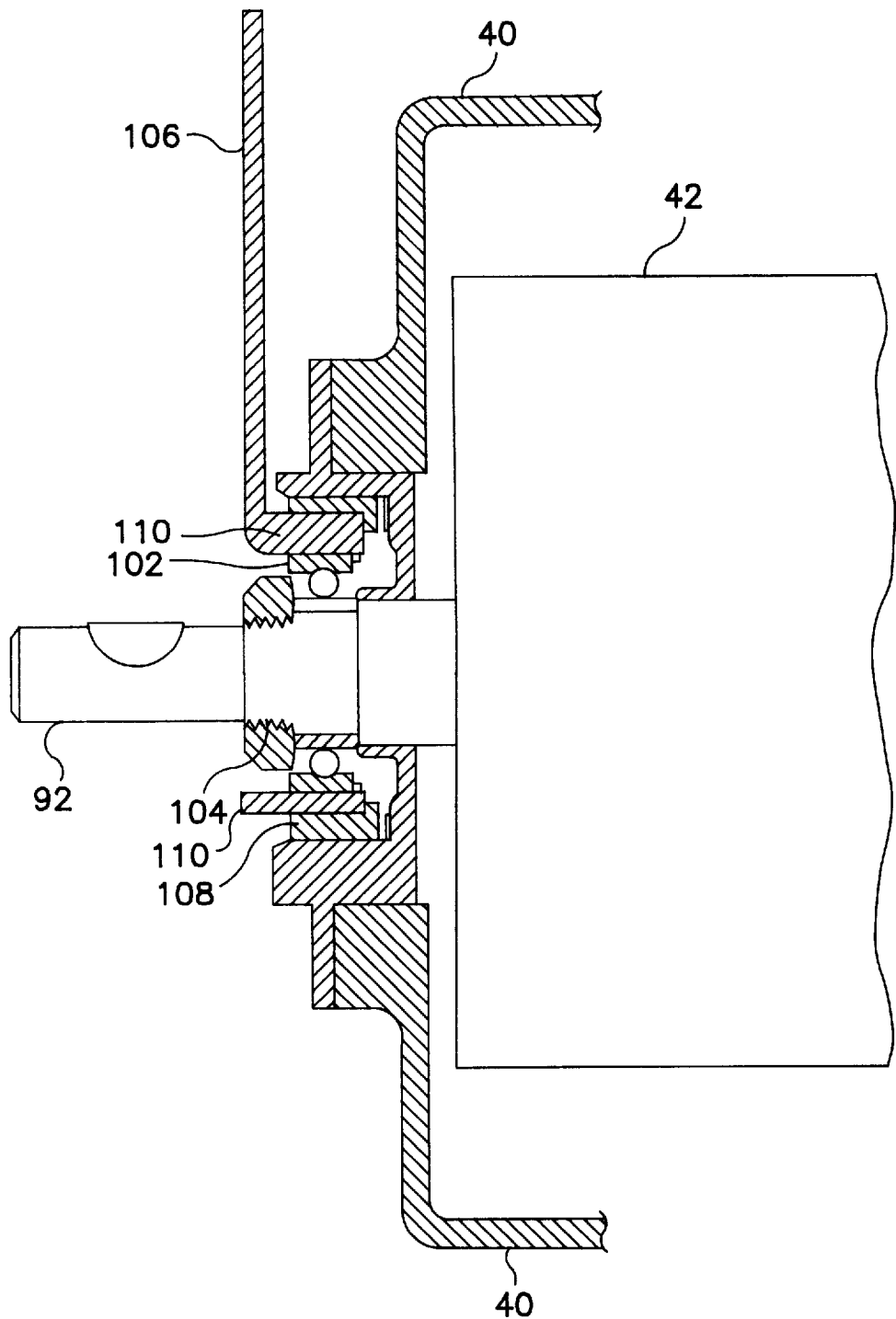
FIG. 7 is an end view of the cylindrical valve illustrating the off center mounting of the stub shaft that imparts the primary eccentric movement of the valve.
Figure 7A:
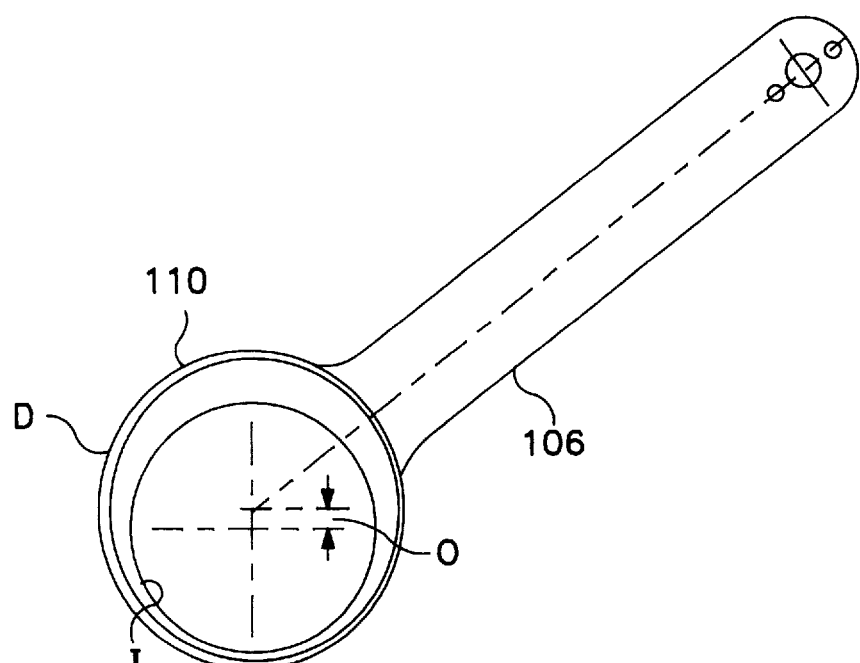
FIG. 7A shows the mounting of the auxiliary control lever on the stub shaft.

Referring to FIG. 7 there is shown a further auxiliary control for adjusting the pressure of the "O" ring 45 to the exit mouth 30. While the eccentric mounting described in connection with FIG. 6 is a primary valve control FIG. 7 is an optional auxiliary control in which providing an additional clearance for opening the valve of 0.01 inches and a clearance 0.015 inches for closing the valve. The stub shaft 92 is mounted in a threaded bushing 104 which in turn is mounted in a ball bearing 102. The eccentric lever 106 is formed with a sleeve on the lever 110 that has an outer diameter D and an inner diameter I with the inner diameter I being smaller then the outer diameter D. The center of the opening I is offset by an amount O. The lever 106 when rotated through 10° will add an additional amount of closure of about 0.015 inches between the "O" ring and the edge 66 of the exit mouth 30. When the lever is actuated to release the "O" ring as a secondary control it moves the tubular structure a distance of 0.010 clearance prior to the primary control taken over. The function of the optional auxiliary eccentric control is to apply additional force if necessary to effect the seal in addition to the primary closure and in the circumstance of opening the valve prerelease the tubular construction from the exit mouth prior to the primary control opening the valve thereby avoiding scraping or bradding the "O" ring 45.

What is claimed is:

1. In an apparatus for controlling the feed of singlet delta oxygen from a singlet delta oxygen generator to a laser gain generator over a non-rectilinear flow path from a first direction to a second direction, said apparatus comprising:
    a singlet delta oxygen generator;
    a laser gain generator;
    a feed line communicating with said singlet delta oxygen generator with the laser gain generator; and
    valve means interposed in said feed line for controlling the feed of said singlet delta oxygen to the laser gain generator, including fluid flow control means for controlling the variation in the velocity of the fluid as it proceeds from said first direction to said second direction, said fluid flow control means comprising a series of vanes disposed in the path of the singlet-delta oxygen for maintaining a uniform rate of flow throughout the cross section of the feed line and arranged to minimize the wake formation from the vanes as the singlet-delta oxygen enters said laser gain generator as the fluid changes direction.

2. In an apparatus for controlling the feed of singlet delta oxygen from a singlet delta oxygen generator to a gain generator for producing a laser beam, said apparatus comprising:
    a singlet delta oxygen generator;
    a laser gain generator;
    a feed line having a mouth portion through which the singlet delta oxygen generator exits to feed into the laser gain generator; and
    valve means rotatably operable between an open position and a closed position interposed in said feed line for controlling the feed of said singlet delta oxygen to the laser gain generator, said valve means comprising a generally cylindrical structure adapted to rotate about a longitudinal axis having axially extending stub shafts and a partial circumferential radially extending surface extending axially between the lateral ends of the cylinder so that in the open position fluid can flow transverse through the cylinder and in the closed position the partial circumferential radially extending surface engages the mouth of the feed line.

3. The apparatus as claimed in claim 2 wherein said partial circumferential radially extending surface is equipped with a resilient "O" ring disposed about the peripheral edge of the circumferential radially extending surface adapted to engage the mouth portion of the feed line.

4. The apparatus as claimed in claim 3 wherein said partial circumferential radially extending surface is formed with a continuous trench that circumscribes its perimeter for affixing the "O" ring to the partial circumferential radially extending surface.

5. The apparatus as claimed in claim 3 wherein the "O" ring has a thickness in the range of about 0.05 inches to about 0.065 inches.

6. The apparatus as claimed in claim 5 wherein the "O" ring is formed of rubber material.

7. The apparatus as claimed in claim 4, wherein the continuous trench has a U-shaped cross section dimensioned to accept the "O" ring with a base dimension of the trench being larger then the opening dimension of the trench and the opening dimension is less then the "O" ring thickness.

8. In an apparatus for controlling the feed of singlet delta oxygen gas from a singlet delta oxygen generator to a laser gain generator over a non-rectilinear path from a first direction to a second direction, said apparatus comprising:
    a singlet delta oxygen generator;
    a laser gain generator;
    a feed line having an exit mouth portion communicating with said singlet delta oxygen generator and with the laser gain generator;
    valve means interposed in the mouth portion of said feed line for controlling the feed of said singlet delta oxygen to the laser gain generator between an open position and a closed position; and
    fluid flow control means associated with said valve means for controlling the fluid velocity passing through the mouth portion as it proceeds from said first direction to said second direction so that the velocity is substantially uniform as it enters said second direction.

9. The apparatus as claimed in claim 1 wherein the second direction is about 90°0 from the first direction and includes a sharp inside turn radius and a larger outside turn radius.

10. The apparatus as claimed in claim 9 wherein the valve means comprises a generally cylindrical structure adapted to rotate about laterally extending stub shafts along a longitudinal axis and having a partial circumferential radially extending surface extending laterally between its lateral ends so as to provide a flow path for the fluid through the valve.

11. The apparatus as claimed in claim 9 wherein the cylinder contains a series of radial partitions positioned normal to the longitudinal axis of the cylinder thereby forming a series of fluid flow control zones.

12. The apparatus as claimed in claim 11 wherein the fluid flow control means comprises an array of curvilinear vanes disposed in each zone transverse to the flow path of the fluid passing through the mouth portion of the feed line.

13. The apparatus as claimed in claim 12 wherein vanes in each zone are fixed between the radial partitions and each vane comprises a segment of a circular arc positioned a predetermined radial distance within each zone forming a concentric array of vanes in the path of the fluid.

14. The apparatus as claimed in claim 11 wherein the valve is divided into four fluid flow control zones each controlling the velocity of the fluid through the mouth of the feed line thereby equalizing the flow across a lateral extent of the mouth portion from the inside turn radius of the feed line to the outer turn radius of the feed line.

15. The apparatus as claimed in claim 14 wherein the fluid velocity in each of the fluid flow control zones successively decreases the velocity from the zone immediately adjacent the inside turn radius of the feed line providing the greatest increase in feed rate and the subsequent adjacent zones successively increasing the fluid velocity so that the average velocity across the exit mouth portion is uniform as the fluid changes direction.

16. A valve operable between an open position and a closed position for controlling the passage of fluid from a first location to a second location along a path that changes the direction of flow between said first and second location thereby introducing a fluid boundary separation condition to the fluid, said valve comprising:

a valve body affixed to the feed line and interposed in the feed path, said valve body having a mouth portion through which the fluid passes;

a tubular structure having a partial circumferential radially extending surface mounted within said valve body and rotatably mounted about a longitudinal axis of said tubular structure;

said partial circumferential radially extending surface adapted to fittingly engage said mouth portion, said partial circumferential radially extending surface having a trench formed along its periphery;

sealing means disposed in said trench to form a seal between said partially circumferential radially extending surface and said mouth portion when in the closed position; and fluid control means disposed within said tubular structure for controlling the fluid boundary separation as the fluid passes through the valve.

17. The valve as claimed in claim 16 wherein the fluid control means comprises a series of laterally extending vanes within the tubular structure arranged parallel to the longitudinal axis and disposed in a series of compartments said vanes being placed in a staggered arrangement with said compartments.

18. The valve as claimed in claim 17 wherein the vanes are curvilinear.

19. The valve as claimed in claim 16 wherein the sealing means is an "O" ring fixed within trench.

20. The valve as claimed in claim 16 wherein the stub shafts are offset from the longitudinal axis to impart eccentric movement of the tubular structure when operated into and out of the closed and open positions.

21. The valve as claimed in claim 16 equipped with a primary control for opening and closing the valve including means for imparting a first eccentric movement to the tubular structure as it moves into and out of contact with the exit mouth portion and in an auxiliary eccentric control for imparting a second eccentric movement to said first eccentric movement during closing of the valve thereby applying additional closure force and releasing said tubular structure providing additional clearance of the second eccentric movement prior to when the primary control opens the valve.

22. The valve as claimed in claim 16 wherein said trench has a "U" shaped cross section with the bottom of the trench having a wider dimension then the top of the trench.

23. The valve as claimed in claim 16 wherein the partial circumferential radially extending surface is configured to register with the exit mouth portion.

24. The valve as claimed in claim 20 wherein the stub shaft is offset from the longitudinal axis in an amount ranging from 0.018 inches to 0.025 inches in the verticle direction and in the an amount in the horizontal direction in the range of from 0.015 inches to 0.022 inches.

25. The valve as claimed in claim 21 wherein the auxiliary eccentric control comprises a lever operated bearing mounted on the stub shaft, said bearing having an inside diameter and an outside diameter wherein the inside diameter is offset from the center of the outer diameter.

26. A method for generating a high energy beam by a chemical laser medium comprising the steps of:

(a) generating singlet-delta oxygen ("$O_2^*$") from a singlet-delta oxygen generator;

(b) feeding the $O_2^*$ to a laser gain generator over a feed line with at least one sharp turn thereby introducing a pressure gradient across the feed line varying the velocity of the fluid through the feed line to the $O_2^*$;

(c) interposing a series of vanes in the feed path between the singlet-delta oxygen generator and the laser gain generator just beyond the sharp turn for controlling the fluid velocity prior to reaching the laser gain generator;

(d) positioning the vanes in step (c) so that they form a spaced apart parallel array extending transverse the feed path of the $O_2^*$; and (e) passing the turbulent $O_2^*$ through the vane array thereby minimizing the velocity variation across the $O_2^*$ path as it leaves the sharp turn.

27. The method as claimed in claim 25 including the step of varying the spacing between the vanes of the parallel arrays.

28. The method as claimed in claim 26 including forming a series of zones comprising the array of vanes placed in the path of the $O_2^*$.

29. The method as claimed in claim 27 including the step of placing the vanes in each zone with different spacing between said vanes within each zone to smooth out the velocity variation.

30. A method for generating a high energy beam by a chemical laser medium comprising the steps of:

(a) generating singlet-delta oxygen ("$O_2^*$") from a singlet-delta oxygen generator;

(b) feeding a fluid stream of $O_2^*$ to a laser gain generator over a feed line with at least one sharp turn thereby introducing a pressure gradient across the feed line varying the velocity of the fluid through the feed line.

(c) Interposing a series of parallel vanes contained in separate compartments in the feed line between the singlet-delta oxygen generator and the laser gain generator adjacent said sharp turn for controlling the fluid velocity prior to reaching the laser gain medium;

(d) staggering the spacing of the vanes in steps (c) so that vanes are not aligned as between any compartment; and (e) passing the variable velocity $O_2^*$ through the compartment with the staggered spacing of the vanes, thereby minimizing the velocity variation of $O_2^*$ going through the turn and minimizing the formation of a wake in the fluid stream by the $O_2^*$ passing through the vanes.

* * * * *